May 16, 1967  B. H. SMITH ET AL  3,320,467
PYROGRAPHITE WAVE STRUCTURES

Filed Oct. 1, 1963  3 Sheets-Sheet 1

INVENTORS
BURTON H. SMITH
SUNGIK F. PAIK
BY Herbert W. Arnold
ATTORNEY

INVENTORS
BURTON H. SMITH
SUNGIK F. PAIK
BY Herbert W. Arnold
ATTORNEY

United States Patent Office 3,320,467
Patented May 16, 1967

3,320,467
PYROGRAPHITE WAVE STRUCTURES
Burton H. Smith, Lexington, and Sungik F. Paik, Westford, Mass., assignors to Raytheon Company, Lexington, Mass., a corporation of Delaware
Filed Oct. 1, 1963, Ser. No. 312,917
15 Claims. (Cl. 315—3.5)

This invention relates to a wave propagating structure for conducting electromagnetic energy so that a slow phase velocity of said wave is produced such as for use in connection with electron discharge devices utilizing such slow-wave propagating structure, and more particularly to a traveling wave electron discharge device utilizing a slow-wave propagating structure, such as a sheath helix of a particular composition which more nearly approximates the ideal sheath helix than other delay lines and renders such sheath helix potentially capable of providing traveling wave electron discharge devices with improved electrical and mechanical characteristics.

The initial theory for the traveling wave tube helix delay line was derived by assuming an ideal sheath helix formed from a sheet of material having, or intended to have, infinite conductivity in one direction and substantially zero conductivity in the perpendicular direction. The sheet was to be formed in to a hollow cylinder in which the direction of infinite conductivity corresponded to the helix angle. However, as is known, it has been impossible to construct such a sheath helix. Rather, it is approximated by a simple helix which has been in general use as a traveling wave tube delay line since its inception. This form of helix generally consists of a wire-wound helix supported by dielectric rods and having several interconnected rings or windings positioned transverse to the direction of the electron beam in a traveling wave tube. A major problem in winding wire helices of this sort is in achieving an accurate pitch from turn to turn. Should this pitch vary along the axis of the tube it will cause reflection of the propagating wave, resulting in objectionable minute variations in gain, referred to as fine grain gain variation. Also, since wire helices require dielectric rods for support, some of the electric fields which normally interact with the beam in the traveling wave tube are diverted radially toward the dielectric rods resulting in a smaller axial electric field in the beam, a lower impedance of the helix and a resulting lower efficiency. Additionally, since heat is removed from existing helices mainly by conduction to the supporting dielectric rods, it has been proposed to make the helix from hollow wire and force coolant through the wire. However, this method presents great mechanical difficulty due to the small diameter of the wire required except at very low frequencies. It is sometime desired to replace a helix-type structure with a conventional finned-type slow-wave propagating structure in a traveling wave device, usually made by cutting transverse slots in a metal block and arranging said slots transverse to the axial traveling electron beam. However, it is difficult, if not impossible, to machine such slots when the wavelength extends into the millimeter region. It is, therefore, desirable to provide a finned structure which can be simply machined to the desired size and which eliminates the problem of maintaining accurate and minute spacing between the fins suitable for millimeter and submillimeter operation.

A primary object of the invention, therefore, is to provide an improved slow-wave propagating structure, such as for use in traveling wave electron discharge devices.

A further object of the invention is to provide an improved slow-wave propagating structure which can be easily constructed and which is capable of efficient operation and improved ability to withstand heat.

In accordance with the invention, a slow-wave propagating structure of pyrolytically formed graphite, sometimes referred to as pyrographite, is provided for use in conjunction with a traveling wave electron discharge device or for general use in a slow-wave structure for interacting with an adjacent beam. In one embodiment of the invention, a pyrographite slow-wave propagating structure in the form of a sheath helix is provided by winding a simple wire helix to the desired pitch, and then depositing pyrographite on this helix until the deposit bridges across the turns, thereby forming a solid cylinder. The inside of the pyrographite cylinder is machined out to a diameter corresponding to the outer diameter of the original helix wire. The resulting interior surface then has the properties of a sheath helix, since the conductivity of the pyrographite deposit on the wire in the helix direction is several thousand times greater than in a direction normal to the helix direction. The resulting sheath helix, or hollow cylinder of pyrographite, permits fabrication of a periodic wave conducting structure for operation at millimeter wave frequencies without requirement to fabricate minute delicate mechanical structures. Since the interaction impedance of a sheath helix is significantly greater than that of a wire helix, the gain and efficiency of a traveling wave tube using the sheath helix will be greater than such tube using a conventional helix. The impedance of the pyrographite sheath helix is greater than that of a simple wire helix because its axial field variation is approximately a pure sinusoid, whereas the axial field variation in a conventional wire helix is represented by space harmonics of a trapezoidal-shaped field and such space harmonics are of smaller amplitudes than the pure sinusoidal sheath helix. Since the sheath helix is completely enclosed, it is substantially free of stop bands and has a relatively broader bandwidth than the conventional helix. In addition, the helix being a continuous and self-supporting structure, the effects of helix pitch variation are reduced, resulting in a lower fine grain variation and increased impedance since there are no dielectric support rods which divert the electric fields from interacting with the traveling wave tube beam.

The invention further discloses structure associated with the pyrographite sheath helix for rapidly dissipating heat and which permits high power operation. This is achieved by machining the outside diameter of the hollow pyrographite cylinder to form a relatively smooth cylindrical surface in which the machined layers of the deposited pyrographite form numerous radial direct heat conducting paths to the outer surface of the sheath. Since in pyrographite good heat conduction occurs in the same plane as good electrical conductivity, heat need only flow radially from the inside diameter where it is generated to the outside diameter where it can be dissipated by a cooling jacket, not shown, containing a cooling liquid. In this manner, a relatively high power wideband traveling wave electron discharge device capable of millimeter operation is provided by utilizing the extreme anisotropy properties of pyrographite or pyrolytically deposited graphite in which the direction of high thermal conductivity is parallel to the surface of the substrate or wire helix upon which the deposit is formed, and the direction of poor thermal conductivity is perpendicular to such substrate surface. For example, in the case of a cylindrical substrata, rather than the aforementioned helix, the pyrolytic graphite or pyrographite body resulting from deposited pyrographite, may take the form of a hollow cylinder whose internal diameter substantially corresponds to the outer diameter of the substrata. In such a body, heat is readily conducted along the cylindrical surfaces, but very little heat transfer takes place in the orthogonal direction, radially of the cylindrical body. That is, the pyrographite body is oriented so that the direction of minimum attenuation of heat or radiation extends in the body in a direction substantially perpendicular to the propagation direction of the electromagnetic radiation and the electron beam. Since a cylinder is generally thought of as being a body having a greater longitudinal dimension than thickness, the thermal characteristics of the hollow cylindrical pyrographite body so formed may be generalized in the statement that the heat flows readily along the surface of the body, but not through such body. In the present pyrographite sheath helix, therefore, heat would be conducted most easily in the helix direction as well as radially. Obviously if a thin pyrographite slice transverse to the axis of the cylinder were to be employed as the heat controlling body, the heat applied to such body would be said to flow readily through the thickness in the radial direction thereof with little or not heat conducted along its surface. A detailed description of a pyrographite body is contained in United States Letters Patent No. 3,096,083, which issued July 2, 1963, to Edward F. Keon, and assigned to the assignee of the present application.

In its broader aspects, the invention discloses a delay line made from pyrographite, which can be employed as a slow-wave propagating structure for a traveling wave tube, backward wave oscillator, or other electron discharge devices. In one embodiment, the delay line is made from a piece of pyrographite soldered to a metal plate and oriented so that the planes of conductivity in such pyrographite correspond to the usual fin structure used in conjunction with a traveling wave tube. One edge of these planes is soldered or electrically connected to a conductive plate, and the delay structure is incorporated as the slow-wave propagating structure in a traveling wave amplifier, the electron beam of said amplifier being directed to flow adjacent to the pyrographite on the side opposite the metal base in the nonconducting direction of the pyrographite. Electromagnetic energy is fed into and out of the ends of the pyrographite structure in a conventional manner, such as used with a metal fin structure, and the phase velocity of the wave on the pyrographite in the nonconducting direction is made approximately equal to the electron velocity to achieve amplification in the traveling wave tube.

In another embodiment, the invention contemplates the use of pyrolytic graphite in a ladder line or a Karp line. The conventional ladder line consists of a series of closely spaced wires or slots along a waveguide wall which are positioned adjacent to and perpendicular to the direction of the electron beam of a traveling wave tube. A conventional Karp line is a modified ladder line in which a ridged waveguide having slots transverse to the beam axis forms a slow-wave propagating structure. In its broad aspect, therefore, the invention contemplates the use of pyrographite substituted for the elements of slow-wave propagating structures, such as a Karp line or ladder line, and, due to the ordered construction of the pyrographite in which each layer is maintained a precise minute distance from the adjacent layers, is therefore capable of providing operation in the millimeter region. In addition, utilizing pyrographite as a finned structure or Karp or ladder line precludes the necessity of depositing pyrographite on a helix or other substrate since pieces of ready-made pyrographite of the desired size can be made by depositing such layers on a simple substrate.

With the above considerations and objects in mind, the invention itself will now be described in connection with a preferred embodiment thereof given by way of example, and not of limitation, and with reference to the accompanying drawings, in which.

Figure 1:
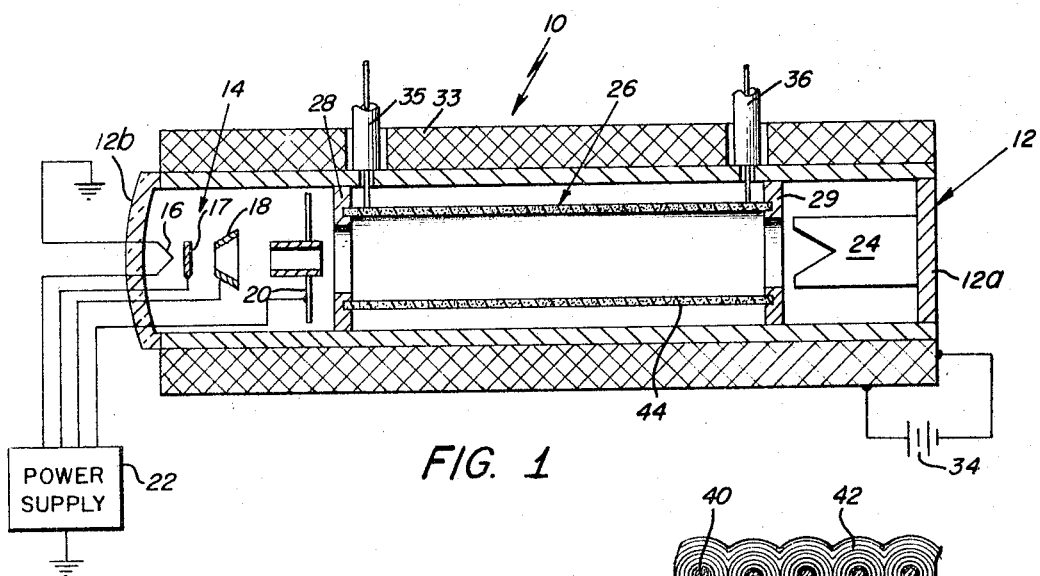
FIG. 1 is a cross-sectional view of a traveling wave tube incorporating a pyrographite slow-wave propagating sheath helix-type structure according to the invention.
Figure 2:
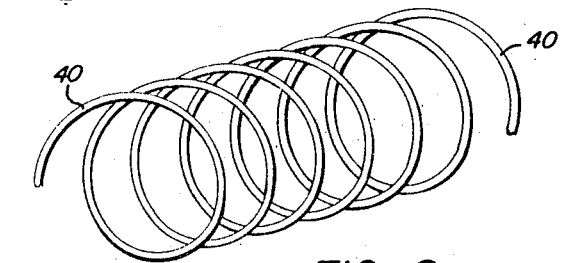
FIG. 2 is a pictorial view of a wire helix used to form a slow-wave propagating structure which may be used in the tube of FIG. 1.
Figure 6:
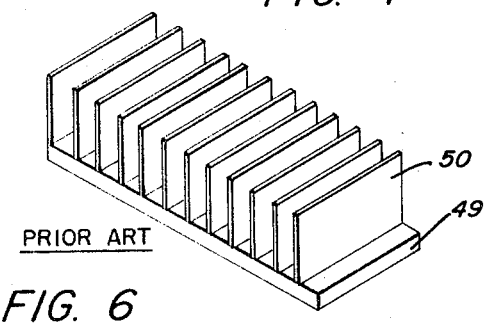
Figure 7:
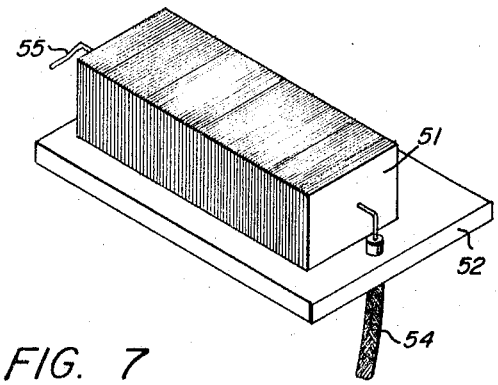
Figure 8:
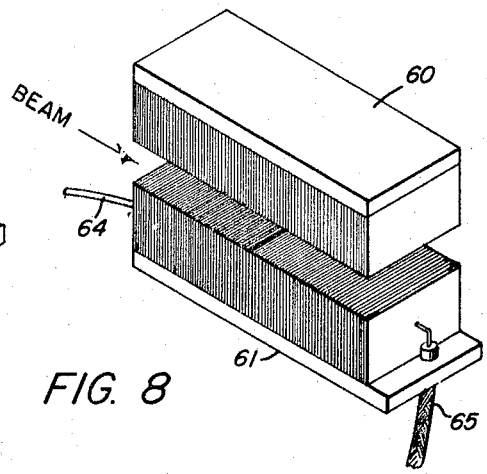
Figure 9:
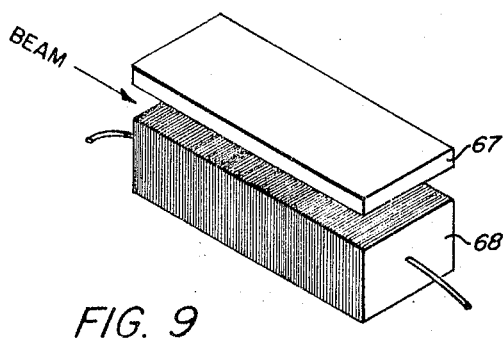
Figure 10:
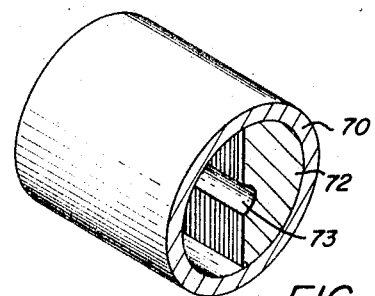
Figure 11:
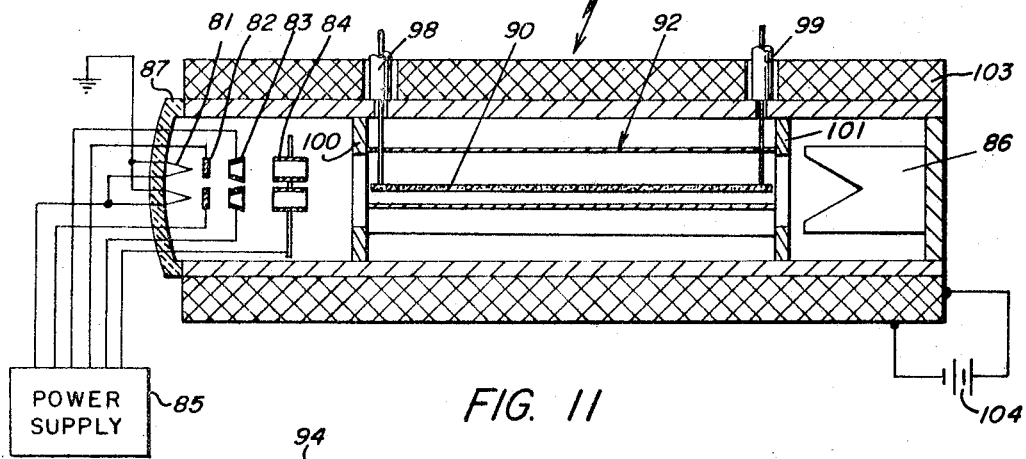
Figure 12:
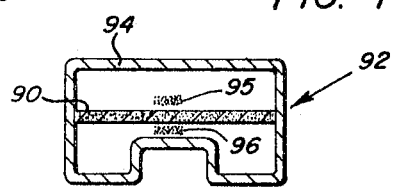
Figure 13:
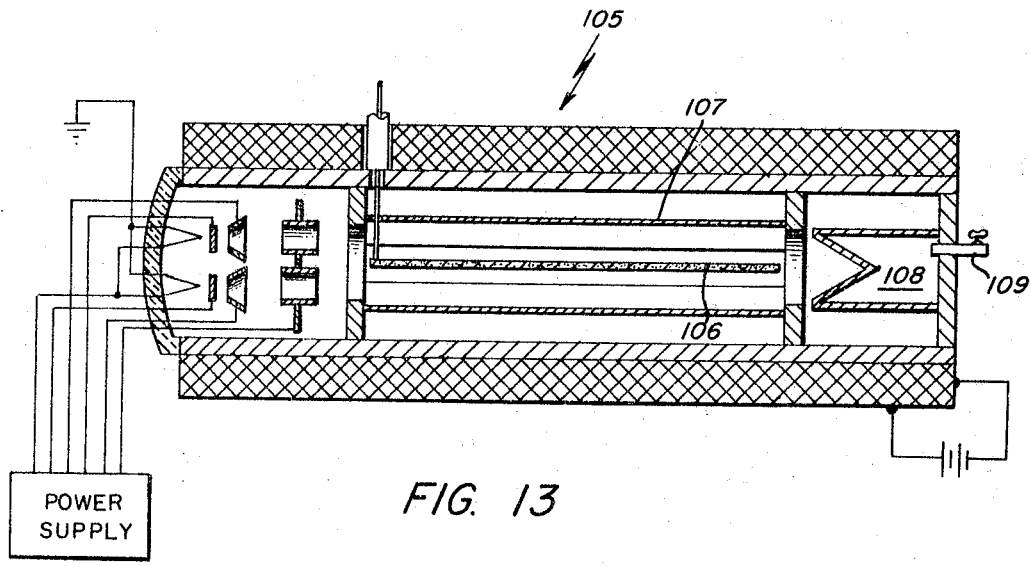
Figure 14:
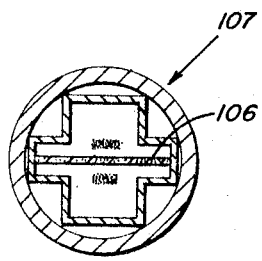
Figure 15:
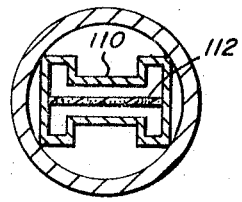
Figure 16:
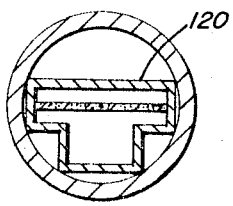
Figure 17:
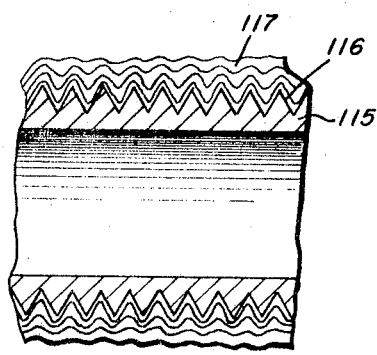

FIG. 6 discloses a conventional finned wave propagating structure;

FIG. 7 is a pictorial view of another type of slow-wave propagating structure which may be used in the tube of FIG. 1;

FIG. 8 is a pictorial view of a double-finned wave propagating structure which may be used in the tube of FIG. 1;

FIG. 9 is a further view of a finned structure for use in the tube of FIGS. 1 and 11;

FIG. 10 is a pictorial view of a portion of a circular finned structure;

FIG. 11 is a cross-sectional view of the double beam traveling wave tube employing the pyrographite structure of FIG. 12;

FIG. 12 is an end view of a pyrographite slow-wave propagating structure of FIG. 11;

FIG. 13 is a cross-sectional view of a double gun backward wave tube utilizing a pyrographite slow-wave propagating structure according to the invention;

FIG. 14 is an end view of the tube of FIG. 13;

FIGS. 15 and 16 are further end views of other types of pyrographite slow-wave propagating structures which may be used in the tubes of FIGS. 11 and 13; and FIG. 17 is an alternate embodiment of a form on which to deposit pyrographite which may be used in place of the helix of FIG. 2.

Referring to FIG. 1 of the drawing, a traveling wave tube 10 is shown which includes a cylindrical evacuated envelope 12 which may consist of a major portion 12a made of an electrically conductive material, and one end portion 12b made of glass or similar electrically insulating material. An electron gun 14 is positioned within the envelope 12 adjacent one end of the traveling wave tube 10 and may be of a type commonly used in traveling wave tubes. The electron gun 14, shown in FIG. 1, includes a heater 16, a cathode 17 associated therewith, a cylindrical focusing electrode 18 and an accelerating electrode 20. Various electrodes of the electron gun 14 are connected to an appropriate power supply 22, whereby an electron beam is produced and directed along the longitudinal axis of the traveling wave tube toward a collector electrode 24 mounted within the tube envelope at or adjacent the end of the tube remote from the electron gun. The leads connecting the electron gun electrodes to the external power supply 22 may be brought out through the glass portion 12b of the tube envelope. The entire envelope 12, of course, may be made of metal and the power supply leads brought out through electrically insulating bushings in the end of the tube envelope adjacent the electron gun. The electron gun electrodes are supported by structural means which have been omitted from the drawing for the sake of simplicity and clarity. The velocity of the electron beam is dependent upon the potentials of the various electrodes of the electron gun.

The slow-wave propagating structure 26 of tube 10 is constructed as described in connection with FIGS. 2 to 5 and comprises a cylindrical helix of pyrographite which is supported along the longitudinal axis of the tube 10 between the electron gun 14 and the collector 24 by means of electrically insulating transverse discoidal members 28 and 29 having recesses in which the pyrographite sheath helix may be inserted.

Figure 3:
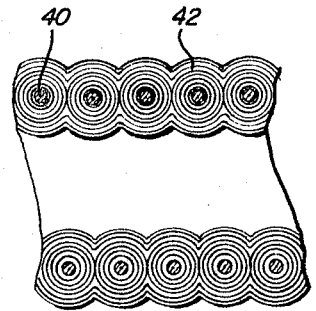
FIG. 3 is a pictorial view in cross section of pyrographite formed on the helix of FIG. 2.
Figure 4:
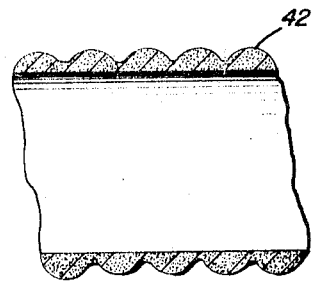
FIG. 4 is a cross-sectional view of the helix of FIG. 3 machined out so that the wire helix of FIG. 2 is removed.
Figure 5:
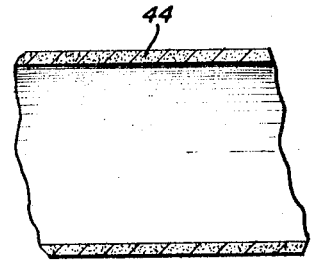
FIG. 5 is a cross-sectional view of the pyrographite sheath helix as incorporated in the tube of FIG. 1.

Transverse motion of electrons is confined within reasonable grounds by means of a longitudinal magnetic field produced by a cylindrical coil 33 surrounding tube envelope 12 and energized by a unidirectional voltage source 34. Input energy may be supplied to the slow-wave structure 26 by means of a coaxial means 35 whose inner conductor is attached to the pyrographite slow-wave structure 26 at or adjacent one end thereof. Output energy is removed from the tube 10 by means of a coaxial output coupling means 36 whose inner conductor is connected to the slow-wave structure 26 at or adjacent the other end. The details of slow-wave structure of the tube 10 shown in FIG. 1 will be given with reference to FIGS. 2 to 5. The pyrographite helix structure in one embodiment is constructed by winding a relatively closely spaced helix made of wire, as shown in FIG. 2, which is wound to the desired pitch. This helix is placed, for example, in a conventional pyrographite heating chamber and heated to a temperature in the presence of a pyrolytic gas at which a deposit of pyrographite forms on this helix of sufficient thickness so that it is bridged across the turns, forming a solid cylinder, as shown in FIG. 3. However, any known method of depositing pyrolytic graphite may be used. In particular, the wire helix 40 of FIG. 2 is shown in FIG. 3 coated with a deposit of pyrographite 42. FIG. 3 shows pictorially the various layers of pyrographite. The inner diameter of the deposit of pyrographite is machined out to form a cylinder of a diameter corresponding to the outer diameter of the original helix wire shown in FIG. 2. The resulting interior surface has the properties of a sheath helix, since the conductivity of the pyrographite in the helix direction will be several thousand times greater than in the perpendicular direction. The effect of this amount of conductivity normal to the helix direction is found to have negligible effect on the longitudinal propagating constant of the helix. FIG. 5 shows the outside as well as the inside diameter of the deposited pyrographite machined out to form a completed pyrographite sheath helix 44 which is then incorporated into the tube of FIG. 1. When desirable, the pyrographite sheath helix can be made vacuum tight by sealing the ends with ceramic insulating material in which it then becomes possible to liquid cool the outer surface of the sheath shown in FIG. 5. However, cooling in this manner is not necessary at temperatures used in connection with the tube of FIG. 1. A unique characteristic of pyrographite which makes it useful in regions where intense heat dissipation occurs is that it actually gets stronger as the temperature increases. Also, its conductivity increases with temperature. A pyrographite sheath helix can therefore operate satisfactorily at a temperature of 2500° C.

Referring now to FIG. 6, there is shown a conventional fin wave propagating structure which is made by cutting slots in a metal block 49 to form fins 50. In accordance with the invention, these slots are simulated by the provision of a pyrographite delay line which is made from a single piece of pyrographite 51 soldered to a metal plate 52, as shown in FIG. 7, the layers of pyrographite being oriented as shown. This delay line may be incorporated into the tube 12 of FIG. 1 and supported therein by discoidal members 28 and 29 in the usual manner. The pyrographite has planes of conductivity, as indicated in FIG. 7, which correspond, a noted, to the usual fins in a fin structure. The unique feature of pyrographite is that its conducting planes are separated by the order of Angstroms and when the height of the fins are shortened to, for example, a few thousandths of an inch, the upper useful frequency limit of the pyrographite fin structure is increased without the usual difficulty of maintaining extremely small spacing between fins. The electron beam of tube 12 is made to flow adjacent the pyrographite on the side opposite to the metal base 52 in the nonconducting direction of the pyrographite. The phase velocity of a wave on the pyrographite, in this nonconducting direction, is made approximately equal to the electron velocity for amplification to occur. RF power is fed into and out of the ends of the pyrographite in a conventional manner by coaxial lead 54 and lead 55. This pyrographite structure is able to dissipate large amounts of heat directly to the metal base, since the pyrographite displays good thermal conduction in the direction of good electrical conduction.

FIGS. 8 and 9 disclose other forms in which the pyrographite structure can be made into the tube of FIG. 1. In FIG. 8, the beam is made to traverse between the parallel oriented sets of fins. In particular, upper and lower pyrographite elements 60 and 61 are suitably supported by discoidal members 28 and 29, the tube of FIG. 1, and the input and output of such pyrographite fins is provided by leads 64 and 65. FIGS. 9 and 10 disclose further embodiments of the pyrographite fin structure. In FIG. 9, the beam is made to traverse between the metal plate 67 and the pyrographite elements 68. In FIG. 10, a cylindrical tube 70 contains a circular sheet of pyrographite 72 into which a central aperture 73 has been made to permit passage of a beam when installed in the tube of FIG. 1 or other traveling wave structures, not shown. While the beam configuration in FIG. 10 is circular, the beam configuration for the pyrographite fin structures of FIGS. 7 to 9 may be made rectangular by the configuration of the conventional beam-shaping elements.

Referring now to FIGS. 11 and 12, there is shown another embodiment of the invention which discloses a single sheet of pyrographite used as a slow-wave structure in a double beam traveling wave tube 80. This tube may be similar to the tube of FIG. 1, except that it includes double beam heater elements 81, cathodes 82, cylindrical focusing electrode 83, and an accelerating electrode 84. These electrodes are connected to an appropriate power supply 85, whereby rectangular-shaped electron beams are produced and directed along the longitudinal axis of the traveling wave tube toward a collector electrode 86 mounted within the tube envelope at or adjacent the end of the tube remote from the electron gun. The leads connecting the electron gun electrodes to the external power supply may be brought out through the glass portion 87 of the tube envelope. In accordance with the invention, a single sheet of pyrographite 90 which can be simply machined to the desired size is supported within a metallic beam structure 92 of a ridged waveguide configuration, shown in FIG. 12, similar to that of the ridged waveguide used in the well-known Karp millimeter wave amplifier and oscillator. In the so-called "Karp circuit," an array of slots or wires is used in the wave propagating structure having an orientation which produces high conductivity in the direction of the wires and zero conductivity in the axial direction. By substituting a relatively simple sheet of pyrographite 90 in a typical Karp structure 92, each segment of the pyrographite may be considered to be a resonator having natural frequencies in the transverse direction, that is along the width of the pyrographite sheet 90 which is an integral number of half wavelengths. The sheet of pyrographite, then, is made of a large or infinite number of resonators. These resonators are coupled to each other due to fringing fields near the ridge of the waveguide structure, and therefore support slow waves in a manner similar to that of coupled-cavity slow wave circuits. One advantage of using a single sheet of pyrographite in connection with such ridged waveguide structure instead of an arrangement of wires, as used in a Karp line, is the simplicity of construction whereby the pyrographite can be simply machined to the desired size. Since such structures are not periodic, the problem of maintaining uniform spacing as between wires of the Karp structure does not arise and operation in the millimeter regions is achieved with the additional advantages of larger interaction impedance than present in conventional structures of this type. Thus, in order to fabricate such structure, it is only necessary to machine a piece of ready-made pyrographite 90 to the desired size and incorporate it into the metallic ridged guide 94, as shown in FIG. 12. This ridged guide is shown installed in the twin gun traveling wave tube of FIG. 11. The beams produced by the twin gun structure are shown at 95 and 96 traveling in a direction perpendicular to the easy conducting layers of the pyrographite. Thus, a slow wave structure, which is particularly simple from a mechanical point of view, is provided, and input energy is applied to such structure by means of a coaxial coupler 98 whose inner conductors are attached to the pyrographite 90 at or adjacent one end thereof. Output energy is removed from the tube by means of a coaxial output coupling 99 whose inner conductor is connected to the slow-wave structure at or adjacent the other end. The remaining details of the tube 80 are similar to the tube shown in FIG. 1 and include discoidal members 100 and 101 which support the waveguide structure 92 within the tube, and a longitudinal magnetic field which is provided by a cylindrical coil 103 surrounding the tube envelope and energized by a unidirectional voltage source 104.

Referring now to FIG. 13, there is shown a backward wave oscillator having a single strip of pyrographite 106 as a wave-propagating structure 105 incorporated in a grooved waveguide structure 107, an axial view of which is shown in FIG. 14, or an alternate grooved waveguide structure 120 of FIG. 16 may be incorporated in the tube 105 of FIG. 13 in a manner similar to that of FIG. 11. In backward wave oscillator tube 105, the collector electrode 108 is constructed to contain a cooling liquid which may be supplied through an input pipe 109. The collector electrode 108, instead of being solid, is hollowed out to provide an internal cooling area. The backward wave tube is constructed in a manner similar to that of the tube of FIG. 11, except only a single coupling is necessary.

FIG. 15 shows an alternate configuration of a ridged waveguide structure 110 which may be supported within the traveling wave amplifier tube of FIG. 11 and contains the pyrographite wave-propagating sheet 112 similar to that of sheet 90 held within the ridged waveguide 110, by means of a small indentation, now shown, in the walls of said waveguide structure.

Referring now to FIG. 17, there is shown an alternate means of providing a cylindrical pyrographite sheath helix suitable for use in the tube shown in FIG. 1. In this instance, instead of coating a wire helix, a large threaded bolt 115 contains threads 116 of the desired pitch. The pyrographite 117 is then deposited in the usual manner on these threads and becomes oriented, as shown pictorially in FIG. 17. The internal and external diameter may be machined out to provide a hollow pyrographite cylinder having a relatively smooth cylindrical surface in which the machined layers of the deposited pyrographite form radial heat conducting paths in the same manner as the pyrographite helix 44 of FIG. 5. This alternate embodiment is included, inasmuch as in some instances it presents a simpler method of providing a substrata upon which the pyrographite can be deposited.

This invention is not limited to the particular details of construction, materials and processes described as many equivalents will suggest themselves to those skilled in the art. Accordingly, it is desired that this invention not be limited to the particular details of the embodiments disclosed except as defined by the appended claims.

What is claimed is:

1. A slow-wave structure containing a pyrographite element oriented so that the direction of easy electrical conductivity in said element extends in a direction substantially perpendicular to the direction of propagation of radiation in said structure.

2. In combination, a signal-amplifying device having a traveling wave interaction between an electron stream and signal waves in which signal energy producing said interaction moves in a wave interaction path opposite to the movement of said electron stream, said interaction path extending adjacent to a pyrographite slow-wave structure oriented so that the direction of easy electrical conductivity is transverse to the movement of said electron stream in said path.

3. In combination, a traveling wave amplifying device having a wave interaction path comprising a pyrographite slow-wave structure oriented so that the direction of minimum electrical dissipation in said pyrographite is substantially perpendicular to the axis of said interaction path.

4. A slow-wave structure comprising a pyrographite sheath helix oriented so that the direction of easy electrical conductivity in said helix extends in a substantially helical direction with respect to the direction of propagation of radiation in said helix.

5. A traveling wave tube comprising a slow wave structure of pyrographite oriented so that the direction of maximum electrical conductivity is transverse to the axis of the interaction path in said structure.

6. A traveling wave electron discharge device having a slow-wave propagating structure comprising a continuous sheet of pyrographite oriented in said structure so that the direction of maximum electrical conductivity in said sheet is in a direction substantially perpendicular to the direction of electromagnetic energy propagated through said structure.

7. A periodic wave conducting structure for conducting a high frequency wave comprising a waveguide having a pyrographite element contained therein, the direction of maximum electrical conduction in said pyrographite being transverse to the axis of said waveguide.

8. In combination, a periodic wave conducting structure for conducting an electromagnetic wave so that a relatively slow phase velocity of fields of said wave is produced alongside an electron beam and in the direction of the movement of said electron beam, said conducting structure including a hollow cylinder of pyrographite, the direction of maximum electrical conduction in said cylinder extending in a helical direction.

9. A signal-generating device having a wave propagating structure in which a traveling wave interaction between an electron stream and signal waves occurs and in which signal energy producing said interaction moves in said wave propagating structure opposite to the movement of said electron stream therein, said wave propagating structure comprising a pyrographite material oriented with respect to the movement of said electron stream so that the direction of maximum electrical conductivity is substantially transverse to the movement of said electron stream.

10. In combination, an electron signal-generating device having a slow-wave propagating structure in which a traveling wave interaction between an electron stream and signal waves occurs and in which signal energy producing said interaction moves in said wave structure opposite to the movement of said electron stream therein, said wave structure comprising a pyrographite material oriented with respect to the movement of said electron stream so that the direction of maximum electrical conductivity is substantially transverse to the movement of said electron stream, and means for extracting a signal from said device.

11. A signal-amplifying device having a wave propagating structure in which a traveling wave interaction between an electron stream and signal waves occurs and in which signal energy producing said interaction moves in said wave-propagating structure in the same direction as the movement of said electron stream therein, said wave propagating structure comprising a pyrographite material oriented with respect to the movement of said electron stream so that the direction of maximum electrical conductivity is substantially transverse to the movement of said electron stream.

12. The method of providing a pyrographite slow-wave structure comprising the steps of depositing layers of pyrographite on a helix of preset pitch until the layers overlap to form a relatively smooth surface, and machining out the pyrographite from said helix to the outer diameter of said helix, and the outer diameter of said pyrographite layers to the desired outer diameter of the slow-wave structure.

13. A traveling wave tube having a slow-wave structure comprising a ridged waveguide having a sheet of pyrographite extending across the central portion thereof and positioned in said traveling wave tube adjacent the interaction path of said tube, means for introducing energy into said tube, and means for extracting energy from said tube.

14. A traveling wave tube having a slow-wave structure comprising a grooved waveguide having a sheet of pyrographite extending across the central portion thereof and positioned in said traveling wave tube adjacent the interaction path of said tube, and means for extracting energy from said tube.

15. In combination, an electron signal-amplifying device having a hollow wave conducting structure comprising a waveguide having a sheet of pyrographite extending across the central portion thereof and positioned in said amplifying device adjacent the interaction path there, said pyrographite material oriented with respect to the movement of said electron stream so that the direction of maximum electrical conductivity is substantially perpendicular to the movement of said electron stream, means for introducing a signal into said device, and means for extracting a signal from said device.

No references cited.

ELI LIEBERMAN, *Primary Examiner.*

M. NUSSBAUM, *Assistant Examiner.*